United States Patent
VanWeelden et al.

(10) Patent No.: US 6,807,943 B2
(45) Date of Patent: *Oct. 26, 2004

(54) MOTOR VEHICLE FUEL INJECTION SYSTEM WITH A HIGH FLOW CONTROL VALVE

(75) Inventors: Curtis L. VanWeelden, Sussex, WI (US); Kathryn I. Bacon, Waukesha, WI (US); Michael Layne, Waterford, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/723,513

(22) Filed: Nov. 26, 2003

(65) Prior Publication Data

US 2004/0103885 A1 Jun. 3, 2004

Related U.S. Application Data

(63) Continuation-in-part of application No. 10/212,331, filed on Aug. 5, 2002.

(51) Int. Cl.⁷ .............................................. F02M 37/04
(52) U.S. Cl. ................... 123/458; 123/506; 123/511; 251/129.02; 251/129.07
(58) Field of Search ................ 123/446, 458, 123/506, 510, 511; 251/129.02, 129.07, 129.16, 282

(56) References Cited

U.S. PATENT DOCUMENTS

| | | | |
|---|---|---|---|
| 4,643,223 A | 2/1987 | Abe et al. | |
| 4,779,838 A | 10/1988 | Greiner et al. | |
| 5,156,341 A | 10/1992 | Terakado et al. | |
| 5,240,227 A | 8/1993 | Sich | |
| 5,251,659 A * | 10/1993 | Sturman et al. | 137/339 |
| 5,476,245 A * | 12/1995 | Augustin | 251/129.02 |
| 5,547,165 A | 8/1996 | Brehm et al. | |
| 5,582,153 A | 12/1996 | Dutt et al. | |
| 5,901,941 A | 5/1999 | Ricco | |
| 5,915,669 A | 6/1999 | Zabeck et al. | |
| 5,950,932 A | 9/1999 | Takeda et al. | |
| 5,982,073 A | 11/1999 | Lashmore et al. | |
| 6,068,236 A * | 5/2000 | Espey | 251/129.07 |
| 6,129,790 A | 10/2000 | Lashmore et al. | |
| 6,152,387 A | 11/2000 | Ricco | |
| 6,217,001 B1 * | 4/2001 | Gluchowski et al. | 251/129.07 |
| 6,244,526 B1 | 6/2001 | Schuldt et al. | |
| 6,251,514 B1 | 6/2001 | Lashmore et al. | |
| 6,422,203 B1 * | 7/2002 | Djordjevic | 123/456 |
| 6,494,182 B1 | 12/2002 | Djordjevic | |
| 6,546,917 B2 * | 4/2003 | Onishi et al. | 123/506 |
| 2002/0053282 A1 | 5/2002 | Duquette et al. | |

* cited by examiner

Primary Examiner—Weilun Lo
(74) Attorney, Agent, or Firm—George E. Haas; Quarles & Brady LLP

(57) ABSTRACT

A gasoline direct injection system of an engine has a high pressure pump with an output connected to a fuel rail that supplies a plurality of fuel injectors. A control valve is connected in parallel with the pump to maintain the fuel rail pressure at a consistent level as the fuel injectors open and close. A valve element engages and disengages a seat to control the flow of fuel through the control valve. The high pressure from the fuel supply rail acts on surfaces of the valve element which are designed to produce a force imbalance that serves to rapidly open the control valve. An electromagnetic actuator, that closes the control valve, has a low impedance coil and pole pieces made of soft magnetic composite material to minimize eddy currents that impede valve performance.

14 Claims, 3 Drawing Sheets

MOTOR VEHICLE FUEL INJECTION SYSTEM WITH A HIGH FLOW CONTROL VALVE

CROSS-REFERENCE TO RELATED APPLICATIONS

This application is a continuation in part of U.S. patent application Ser. No. 10/212,331 filed on Aug. 5, 2002.

STATEMENT REGARDING FEDERALLY SPONSORED RESEARCH OR DEVELOPMENT

Not Applicable

BACKGROUND OF THE INVENTION

1. Field of the Invention

The present invention relates to fuel injection systems for internal combustion engines, and particularly to valves for controlling pressure of fuel delivered to injector valves in the engine.

2. Description of the Related Art

For many decades gasoline internal combustion engines used a carburetor to mix fuel with incoming air. The resulting air/fuel mixture was distributed through an intake manifold and mechanical intake valves to each of the engine cylinders. Multi-port fuel injection systems have replaced the carburetion systems for most engines. A multi-port fuel injection system has a separate fuel injector valve which injects gasoline under pressure into the intake port at each cylinder where the gasoline mixes with air flowing into the cylinder. Even with multi-port fuel injection, there are limits to the fuel supply response and combustion control which can be achieved.

More recently a third approach to supplying fuel into the engine cylinders has been devised. Known as "gasoline direct injection" or "GDI", this techniques injects the fuel directly into the combustion cylinder through a port that is separate from the air inlet passage. Thus the fuel does not premix with the incoming air, thereby allowing more precise control of the amount of fuel supplied to the cylinder and the point during the piston stroke at which the fuel is injected. Specifically, when the engine operates at higher speeds or higher loads, fuel injection occurs during the intake stroke which optimizes combustion under those conditions. During normal driving conditions, fuel injection happens at a latter stage of the compression stroke and provides an ultra-lean air to fuel ratio for relatively low fuel consumption. Because the fuel may be injected while high compression pressure exists in the cylinder, gasoline direct injection requires that the fuel be supplied to the injector valve at a relatively high pressure, for example 100 times that used in multi-port injection systems.

There are periods when all of the injector valves are closed and thus the gasoline in the conduit, known as the fuel supply rail, between the outlet passage of the fuel pump and cylinders has no place to go. This has not presented a significant problem in prior fuel systems that operated at lower pressure. However, at the significantly greater pressure of the gasoline direct injection system, the fuel system components down stream of the fuel pump must be capable of withstanding that pressure. In addition, a very high back pressure load occurs at the fuel pump at those times.

Therefore it is desirable to provide a mechanism for maintaining a consistent pressure level in the section of the fuel system that is downstream of the fuel pump outlet passage even as the injector valves open and close.

SUMMARY OF THE INVENTION

A direct injection fuel delivery system for a motor vehicle includes a pump with an inlet connected to a fuel supply and an outlet which supplies the liquid fuel at a high pressure. A common fuel rail coupled to the outlet of the pump and at least one fuel injector nozzle connected to the common fuel rail. A flow control valve is connected between the inlet and the outlet of the pump to selectively provide a fluid path there between.

The flow control valve comprises a valve stem, a valve element, and a solenoid actuator. The valve stem has a bore with a valve seat at one end and has an inlet port that opens into the bore. The inlet of the pump communicates with the one end of the bore and the outlet of the pump communicates with the inlet port. The valve element is received within the bore and selectively engages the valve seat to control flow of fluid between the inlet and the outlet of the pump. The valve element has an exterior groove in communication with the inlet port. The exterior groove has a first surface proximate to the valve seat and a second surface remote from the valve seat. The first surface is larger than the second surface so that pressure in the exterior groove tends to move the valve element away from the valve seat. The solenoid actuator is operatively coupled to the valve element so that activation of the solenoid actuator moves the valve element toward the valve seat.

To ensure high speed operation of the flow control valve, components of the solenoid actuator preferably are fabricated from a soft magnetic composite material. This material provides a non-electrically conductive path for the magnetic flux, thereby reducing the eddy currents that slow build-up of the magnetic flux and thus the speed of the actuator.

DETAILED DESCRIPTION OF THE INVENTION

Figure 1:
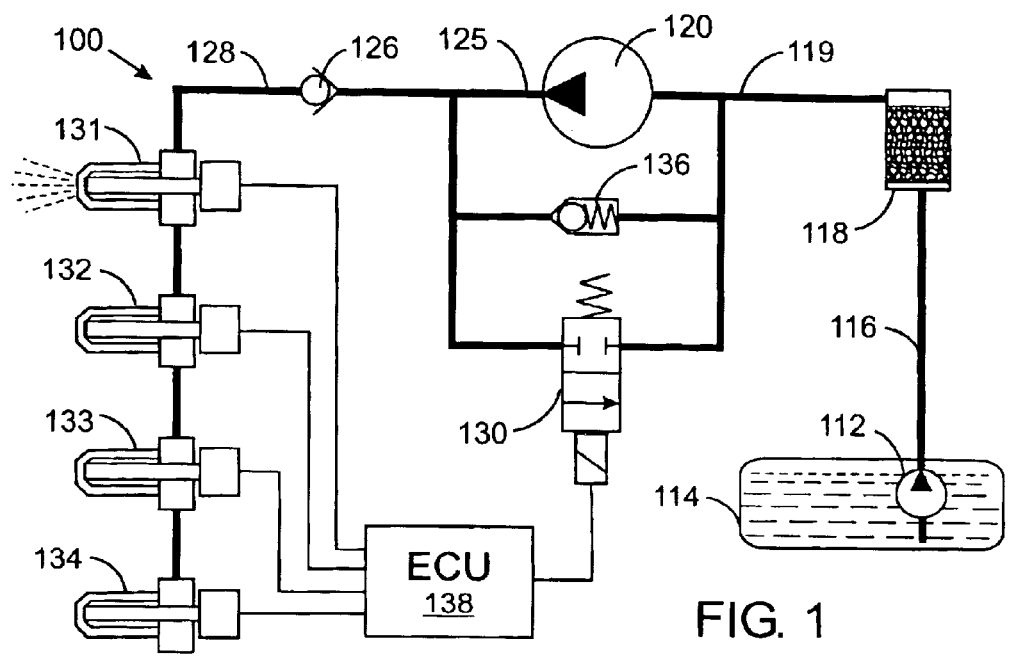
FIG. 1 is a schematic view of a direct gasoline injection fuel system for a motor vehicle.

With initial reference to FIG. 1, a direct gasoline injection (GDI) fuel system 100 for the engine of a motor vehicle has an electric feed pump 112 located in or adjacent to the fuel tank 114. The feed pump 112 forces gasoline through fuel line 116 at a relatively low pressure (e.g. 2–5 bar) to a conventional fuel filter 118 and then through an inlet line 119 to a supply pump 120 located near the engine. This latter supply pump 120 furnishes the gasoline under relatively high pressure (e.g. 200–250 bar) through a pump outlet line 125 and a non-return check valve 126 to the common fuel rail 128 which feeds a plurality of individual fuel injectors 131, 132, 133 and 134 for the engine cylinders. A standard mechanical pressure relief valve 136 is provided in parallel with the supply pump 120 to relieve any dangerously high pressure from occurring in the pump outlet line 125.

A control valve 130 manages the instantaneous outlet pressure of the supply pump 120 by diverting and modulating the pressure of the discharge gasoline flow in the pump outlet line 125. Specifically, the control valve 130 relieves the high pressure at the pump outlet by returning the gasoline to the lower pressure inlet line 119 for the pump. The control valve 130 is normally open and closes when a solenoid actuator is energized. The timing and duration of solenoid activation is controlled by the engine management system that includes an electronic control unit (ECU) 138 which controls the flow of gasoline through the control valve 130. The electronic control unit 138 also electrically operates the fuel injectors 131–134.

During steady state operation above the idle speed of the engine, the fuel injections into the cylinders are discrete events, beginning at regular time intervals and having identical duration. During an injection event, the control valve 130 is closed so that pressure in the pump outlet line 125 rises to the desired high supply level (e.g. 200 bar). Between fuel injection events, the control valve 130 is opened so that the fuel displaced by the high pressure supply pump 120 is recycled to the inlet line 119. Without that displacement of fuel, pressure in the common fuel rail 128 would rise above 200 bar. Opening the control valve 130 maintains the pressure in the common fuel rail 128 at approximately the 200 bar level when all the fuel injectors are closed. Each activation of the control valve 130 and thus each occurrence of high pressure in pump outlet line 125 has a longer duration than the associated injection event. The injection event, control valve activation, and high pump outlet line pressure all terminate substantially simultaneously. Operation of this type of gasoline direct injection system is described in detail in U.S. Pat. No. 6,494,182.

Figure 3:
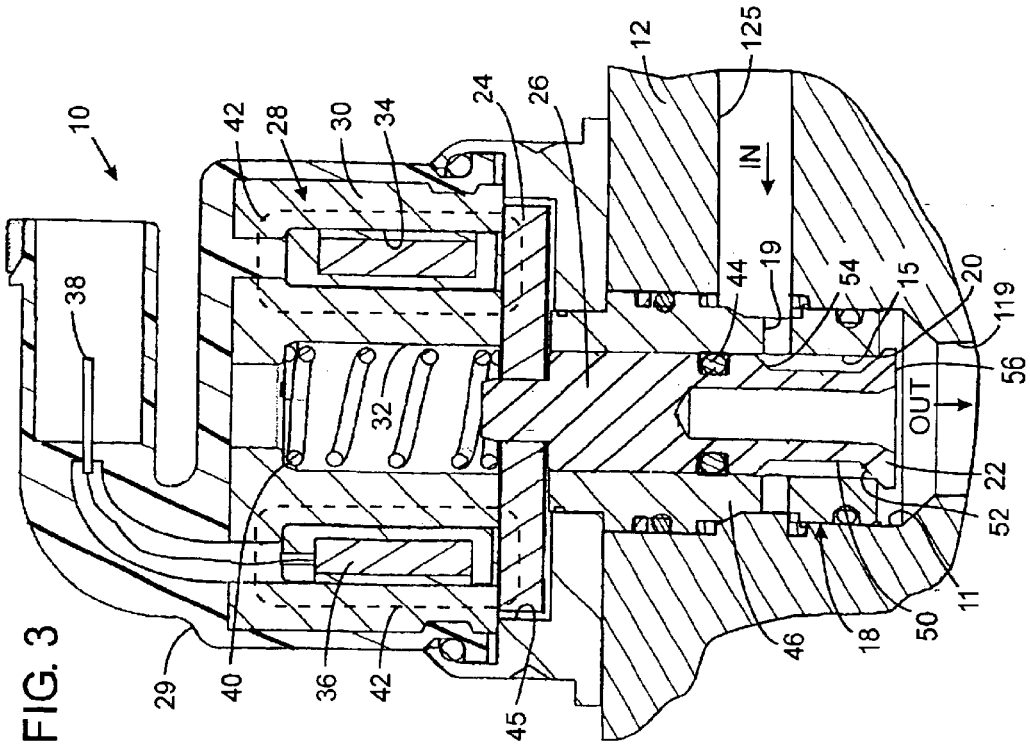
FIG. 3 is a cross sectional view along line 3—3 in FIG. 2.
Figure 2:
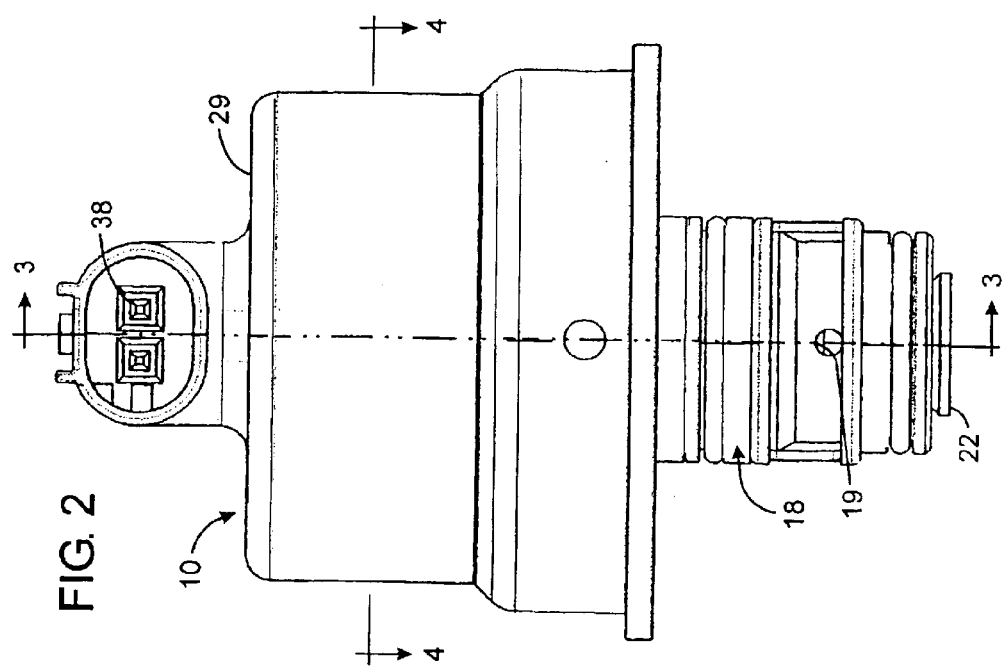
FIG. 2 side view of a first embodiment of a solenoid valve in the fuel system.

With reference to the FIGS. 2 and 3, an electrohydraulic flow control valve 10 mounts within an aperture 11 in the body 12 of the supply pump 120. The pump outlet line 125 opens into the aperture 11 through a side wall and the bottom of the aperture 11 communicates with the inlet line 119. The flow control valve 10 has a tubular stem 18 which extends into the fuel pump aperture 11 and interfaces with both the inlet line 119 and outlet line 125 to control the fluid flow there between. Specifically, the valve stem 18 has a longitudinal bore 15 extending there through with a transverse inlet port 19 coupling the outlet line 125 to the aperture. A valve seat 20 is formed at an end opening of the bore 15 which communicates with the inlet line 119. A valve element 22 is slidably received in the bore 15 of the valve stem 18 and has an interior end with a tapered section that abuts the valve seat 20 in the closed state of the flow control valve.

Figure 4:
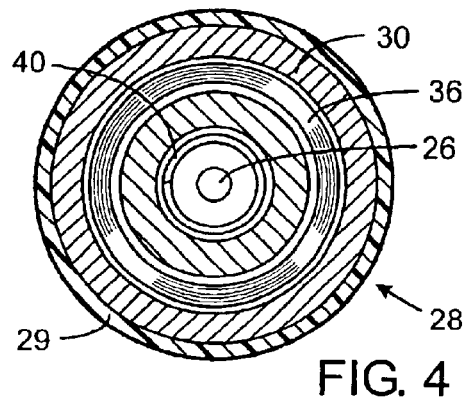
FIG. 4 is a cross sectional view along line 4—4 in FIG. 2.

The other end of valve element 22 is mechanically joined, such as by brazing or welding for example, into a central aperture in an armature disk 24. On the opposite side of the armature disk 24 is a solenoid actuator 28, which has a plastic outer housing 29 that encloses a magnetically conductive pole piece 30 with a central aperture 32 and an annular groove 34 extending around the central aperture (see FIG. 4). An electromagnetic coil 36 is wound within the annular groove 34 and has leads which extend to a connector 38 for connection to the controller that governs engine operation. The electromagnetic coil 36 has an inductance that is less than 3.0 mH and a resistance that is less than 1.0 Ohm. Preferably the inductance of the electromagnetic coil 36 is 2.5 mH and the resistance is 0.2 Ohm. A spring 40 within the central aperture 32 of the pole piece biases the armature disk 24 so as to push the valve element 22 away from the valve seat 20 and open the valve.

Energizing electromagnetic coil 36 produces a magnetic field indicated by flux lines 42 which attracts the armature disk 24 toward the pole piece 30 to pull the valve element 22 against the valve seat 20 closing the valve, as illustrated in FIG. 3. The magnetic flux flows through the armature disk 24 and pole piece 30. The size of the electromagnet coil required to generate the necessary force is reduced by providing large cross section areas and very small air gaps through which the flux 42 flows.

The pole piece 30 is made of "soft-magnetic composite material" which is a powder comprising a plurality of ferromagnetic particles with an electrical insulating coating. The coating imparts electrical insulation adjacent the ferromagnetic particles of at least one milliohm-cm. The valve component 30 is fabricated by compacting the ferromagnetic powder. Soft magnetic composite materials and processes for fabricating electromagnet cores from them are described in U.S. Pat. No. 6,251,514. Because the individual particles ferromagnetic powder are electrically insulated from one another, the pole piece 30 provides a non-electrically conductive path for the magnetic flux which reduces the eddy currents that otherwise would slow reversal of the flux. Reduction of eddy currents enables the electromagnet actuator of the valve to have a fast response time as compared to actuators with conventional electromagnet pole pieces.

A key factor in the valve operation is that the armature disk 24 does not come into contact with the liquid fuel flowing through the flow control valve 10. A seal 44 prevents the fuel from traveling between the valve element 22 and the outer section 46 of the valve stem 18 and thus from reaching the armature disk 24. The isolation of the armature disk 24 from the fluid being controlled is a significant feature of the present flow control valve 10.

Figure 5:
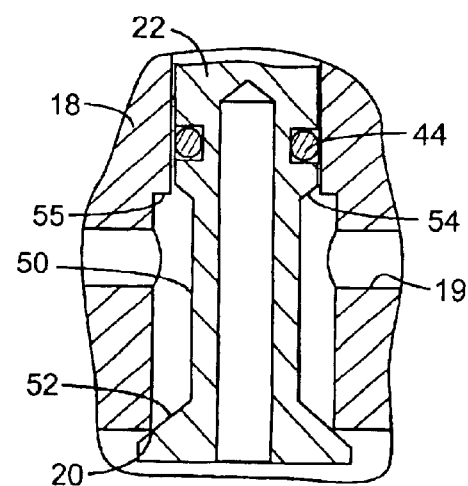
FIG. 5 is an enlargement of the valve area in FIG. 3.

With reference to FIGS. 3 and 5, the forces due to the fluid pressures acting on the valve element 22 are substantially imbalanced to provide a fast open time. Specifically, the valve element has an outer circumferential groove 50 with a first end surfaces 52 proximate the valve seat 20 and a second end surface 54 remote from the valve seat, with both end surfaces being exposed to the high pressure fluid in the outlet line 125 from the fuel supply rail. The diameter of the valve stem bore 15 in the vicinity of the circumferential groove 50 is slightly larger that the diameter of the bore closer to the armature 24, thereby creating a lip 55 adjacent the second end surface 54 (FIG. 5). As a result, the area of the second end surface 54 is substantially smaller than the area of the first end surface 52 which is exposed to the high pressure fluid when the valve is closed.

Because of this surface area differential, the force produced by the high pressure fluid acting on those end surfaces 52 and 54 is greater in a direction which tends to move the valve element 22 away from the valve seat 20, i.e. open the valve. As a consequence, a relatively small force from the spring 40 is able to overcome force exerted on the nose 56 of the valve element 22 by the relatively low pressure in the inlet line 119 and thus open the flow control valve 10. However, the magnetic force from the electromagnetic coil 36, required to close the flow control valve 10, must be great enough to overcome the inlet passage pressure and the spring force.

The present valve 10 has particular use in regulating the pressure in the fuel rail 120 of the fuel injection system 100 for an internal combustion engine. In that application, the valve is opened and closed very rapidly many times during each cycle of the engine to relieve pressure at the fuel pump outlet. The flow control valve 10 has several features that contributes to the ability to operate at such high speeds. The size differential of the end surfaces of the groove 50 in the valve element, and the relatively low inductance and resistance of the solenoid actuator are two of these features. Other features include the use of soft magnetic composite material for the pole piece of the solenoid which reduces eddy currents. Another factor enhancing performance of the flow control valve 10 is that the armature 24 of the solenoid actuator 28 does not come into contact with the fuel flowing through the valve and thus the armature motion encounters a lower fluidic resistance of air as compared to liquid fuel.

Figure 6:
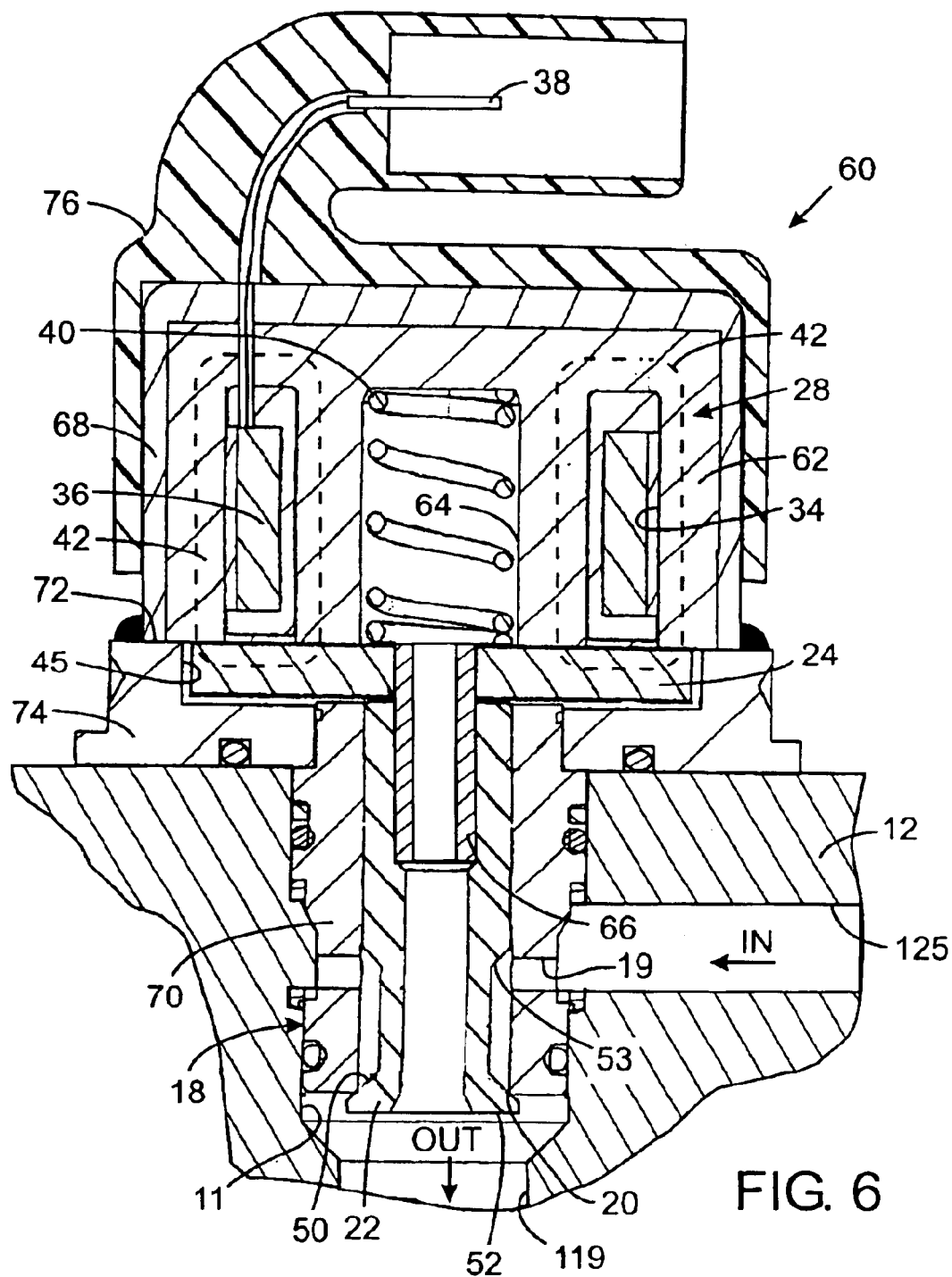
FIG. 6 is a cross sectional view of a second embodiment of a solenoid valve for the fuel system.

However, it is not absolutely essential that fuel be prevented from contacting the armature 24. In this regard, FIG. 6 illustrates a second embodiment of a control valve 60 which has the same exterior appearance as shown in FIG. 2. The components that are the same as those in the first control valve 10 in FIG. 3 have been assigned the same identification numerals. The armature 24 has a central aperture with a tubular connector pin 66 welded therein. The connector pin 66 also is press fitted into a valve element 22 that extends completely through the valve element 70 which, except for that through bore, has the same construction as the valve element 22 in the first valve 10. Thus fuel in the pump inlet line 119 is able to flow through the valve element 22 and the connector pin 66 into the central aperture 64 and the groove 34 for the electromagnetic coil 36 in the solenoid actuator 28.

To prevent this fuel from leaking from the control valve 60, a metal cap 68 extends over the solenoid actuator 28. A circular lip 72 of the metal cap 68 is welded to the base plate 74 of the control valve thereby providing a fluid tight seal that is able to withstand the high pressure in the pump outlet line 125. Thus the metal cap 68 and base plate 74 enclose the solenoid actuator 28. A plastic outer housing 76 is molded over the metal cap 68.

The second control valve differs from the first one in that the interior of the solenoid actuator 28 is not sealed from the fuel lines 119 and 125 and thus the fuel comes into contact with the internal components, such as the armature 24 and the electromagnetic coil 36.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A direct injection fuel delivery system for a motor vehicle comprising:
    a pump having an inlet connected to a fuel supply and an outlet at which the liquid fuel is supplied at a pressure of at least 50 bar;
    a common fuel rail coupled to the outlet of the pump;
    at least one fuel injector nozzle connected to the common fuel rail; and
    a flow control valve connected between the inlet and the outlet of the pump to selectively provide a fluid path there between, the flow control valve comprising:
    (a) a valve stem having a bore with a valve seat at one end and having an inlet port that opens into the bore, wherein the inlet of the pump communicates with the one end of the bore and the outlet of the pump communicates with the inlet port,
    (b) a valve element within the bore and selectively engaging the valve seat to control flow of fluid between the inlet and the outlet of the pump, wherein the valve element has an exterior groove in communication with the inlet port, the exterior groove having first surface proximate to the valve seat and a second surface remote from the valve seat, wherein the first surface is larger than the second surface so that pressure in the groove tends to move the valve element away from the valve seat, and
    (c) a solenoid actuator operatively coupled to the valve element so that activation of the solenoid actuator moves the valve element toward the valve seat.

2. The control valve as recited in claim 1 wherein the solenoid actuator comprises an electrical coil and an armature which is operatively coupled to move the valve element toward the valve seat in response to an electromagnetic field produced by the electrical coil.

3. The control valve as recited in claim 2 wherein the electrical coil has an inductance that is less than 3.0 mH and a resistance that is less than 1.0 Ohm.

4. The control valve as recited in claim 2 wherein the solenoid actuator comprises a pole piece fabricated from a soft magnetic composite material and about which the electrical coil is wound.

5. The control valve as recited in claim 4 wherein the solenoid actuator comprises magnetically conductive, disk-shaped armature adjacent the pole piece.

6. The control valve as recited in claim 1 further comprising a seal between the valve stem and the valve element to prevent fuel in the bore from flowing to the solenoid actuator.

7. The control valve as recited in claim 1 further comprising a spring biasing the valve element away from the valve seat.

8. The control valve as recited in claim 1 further comprising an enclosure having a base with an aperture through which the valve stem extends, and a cap extending around the solenoid actuator and sealed to the base.

9. A direct injection fuel delivery system for a motor vehicle comprising:
    a supply line carrying a liquid fuel;
    a pump having an inlet connected to the supply line and an outlet;
    a common fuel rail coupled to the outlet of the pump;
    a plurality of fuel injector nozzles coupled to the common fuel rail; and
    a flow control valve connected between the inlet and the outlet of the pump to selectively provide a fluid path there between, the flow control valve comprising:
    (a) a valve stem having a bore with a valve seat at one end and having an inlet port that opens into the bore, wherein the inlet of the pump communicates with the one end of the bore and the outlet of the pump communicates with the inlet port,
    (b) a valve element within the bore and selectively engaging the valve seat to control flow of fluid between the inlet and the outlet of the pump, wherein greater pressure in the bore than at the inlet of the pump tends to move the valve element away from the valve seat, and
    (c) a solenoid actuator having an electrical coil and a armature having a disk shape, wherein the armature is operatively coupled to move the valve element toward the valve seat in response to an electromagnetic field produced by the electrical coil, the a solenoid actuator including a spring engaging the armature to bias the valve element away from the valve seat.

10. The control valve as recited in claim 9 wherein the electrical coil has an inductance that is less than 3.0 mH and a resistance that is less than 1.0 Ohm.

11. The control valve as recited in claim 9 wherein the solenoid actuator comprises a pole piece fabricated from a soft magnetic composite material and having an annular groove with in which the electrical coil is wound.

12. The control valve as recited in claim 11 wherein the solenoid actuator comprises magnetically conductive, disk-shaped armature adjacent the pole piece.

13. The control valve as recited in claim 9 further comprising a seal between the valve stem and the valve element to prevent the liquid in the bore from flowing to the solenoid actuator.

14. The control valve as recited in claim 9 further comprising an enclosure having a base with an aperture through which the valve stem extends, and a cap extending around the solenoid actuator and sealed to the base.

* * * * *